Figure 1:
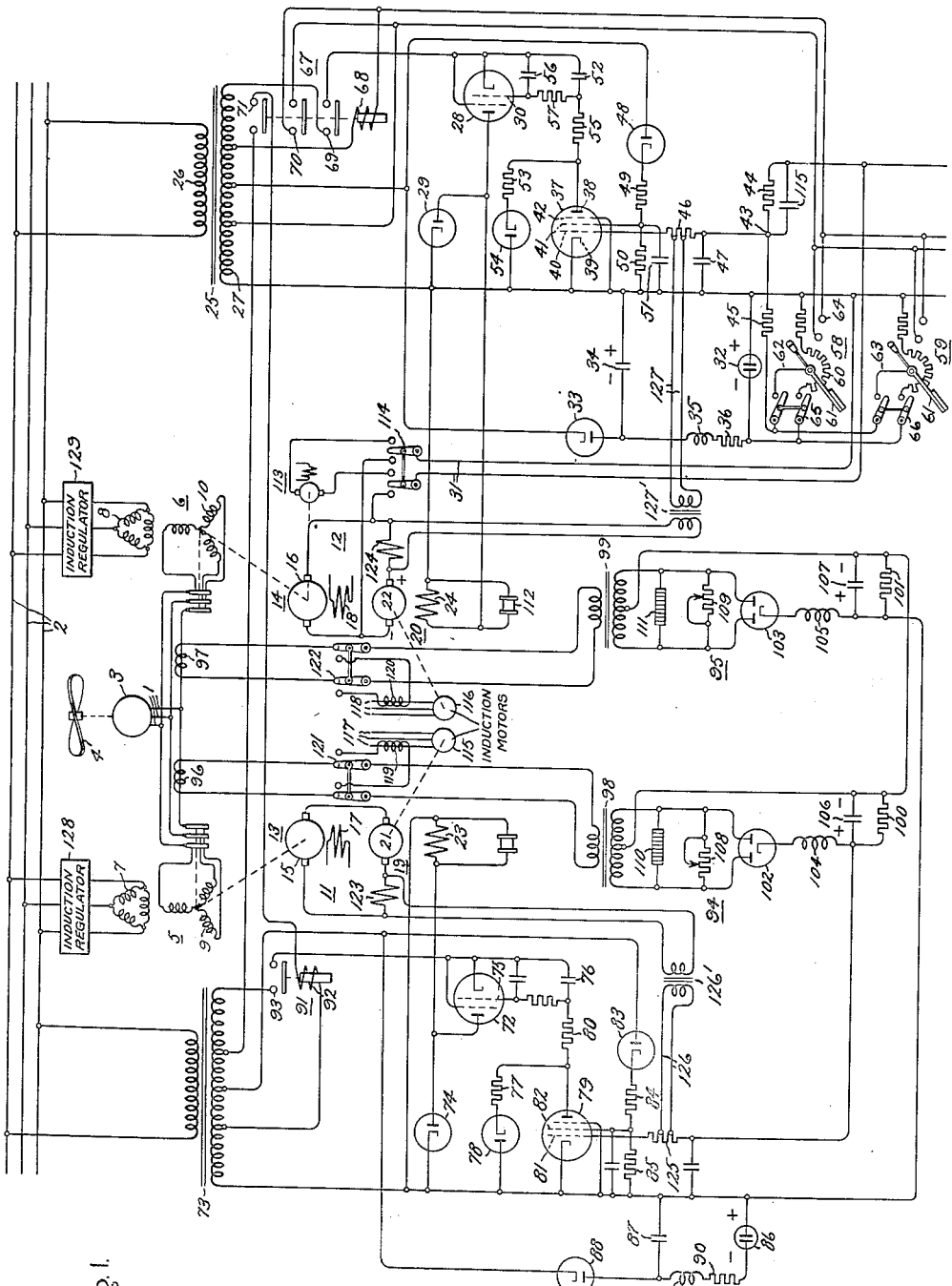

Dec. 7, 1943.   E. E. MOYER ET AL   2,335,874
ELECTRIC FREQUENCY CHANGING SYSTEM
Filed Aug. 10, 1942   2 Sheets-Sheet 2

Inventors:
Charles C. Clymer,
Elmo E. Moyer,
by Harry E. Dunham
Their Attorney.

Patented Dec. 7, 1943

2,335,874

UNITED STATES PATENT OFFICE 2,335,874

ELECTRIC FREQUENCY CHANGING SYSTEM

Elmo E. Moyer, Scotia, and Charles C. Clymer, Altamont, N. Y., assignors to General Electric Company, a corporation of New York Application August 10, 1942, Serial No. 454,230

39 Claims. (Cl. 172—281)

Our invention relates to electric frequency changing systems, and more particularly to systems wherein a plurality of dynamo-electric machines are employed for transmitting power from an alternating current supply circuit to an alternating current load circuit having a frequency different from that of the supply circuit.

In some applications it is desirable to transmit relatively large amounts of power to an alternating current load circuit at a frequency substantially different from that of an associated alternating current supply circuit, and to determine and control the frequency of the current so supplied. In accordance with the teachings of our invention described hereinafter, we provide a new and improved electric frequency changing system which offers a wider range of control and flexibility than that afforded by the prior art arrangements.

It is an object of our invention to provide a new and improved electric frequency changing system.

It is another object of our invention to provide a new and improved system of dynamo-electric machines of the induction type whereby power may be transmitted to an alternating current load circuit and wherein the frequency is accurately determinable and controllable.

It is a further object of our invention to provide a new and improved electric control system for dynamo-electric machines.

It is a still further object of our invention to provide a new and improved control system for obtaining a predetermined division of load among a plurality of parallel operating dynamo-electric machines of the induction type.

It is a still further object of our invention to provide a new and improved electric valve frequency controlling system for a dynamo-electric machine of the induction type such as a frequency converter.

It is a still further object of our invention to provide a new and improved electric converting system for controlling the speed of an alternating current induction motor.

Briefly stated, in the illustrated embodiment of our invention we provide a new and improved electric frequency changing or converting system wherein the speed of an alternating current induction motor is controlled by energizing the motor from an alternating current supply circuit through a plurality of dynamo-electric machine induction type frequency converters. Apparatus is provided for controlling the speed of the motor, and additional apparatus is provided for maintaining a predetermined or equal distribution of load among the frequency converters.

Figure 2:
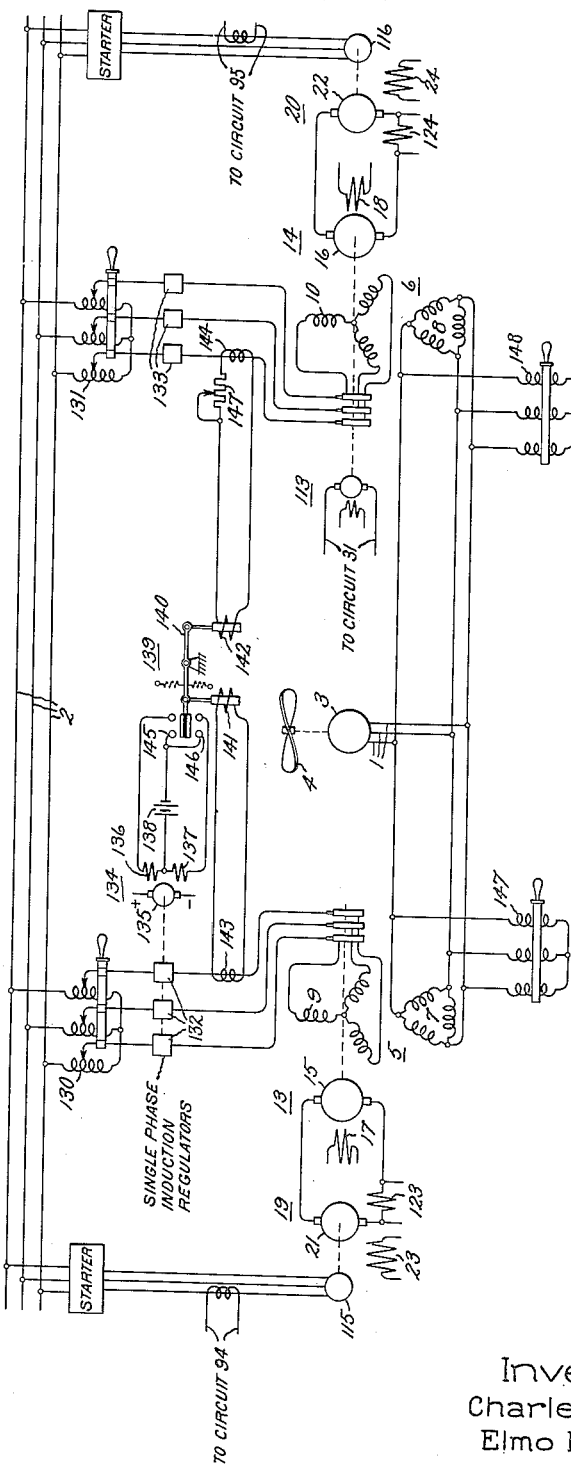

For a better understanding of our invention, reference may be had to the following description taken in connection with the accompanying drawings, and its scope will be pointed out in the appended claims. Fig. 1 of the drawings diagrammatically illustrates an embodiment of our invention as applied to a system wherein the speed of an alternating current induction motor is controlled, and Fig. 2 diagrammatically illustrates a modification of the arrangement shown in Fig. 1.

Referring now to Fig. 1 of the drawings, our invention is there illustrated as applied to an electric frequency changing or converting system for supplying alternating current power to an alternating current load circuit 1 from an alternating current supply circuit 2. More specifically, our invention, as shown, is applied to a system wherein the speed of an induction motor 3 is controlled by controlling the frequency of the current supplied to the load circuit 1. The induction motor 3 may be employed to drive a suitable load such as a fan 4.

We provide a plurality of frequency changing means such as dynamo-electric machines or frequency converters 5 and 6 which may be of the wound rotor type having stator members including windings 7, 8 and rotor members including windings 9, 10, respectively. The rotor windings or secondary windings 9 and 10 are connected to the alternating current load circuit 1.

In order to drive independently the rotor members of the frequency converters 5 and 6 and to deliver power thereto, we provide a plurality of individual or independent driving means 11 and 12. These driving means may be Ward Leonard sets comprising motors 13, 14 having armature windings 15, 16 and field windings 17, 18, respectively. The Ward Leonard sets 11 and 12 also include generators 19, 20 having armature windings 21, 22 and field windings 23, 24, respectively. It will be noted that the armatures of the motors 13 and 14 are mechanically coupled to the rotor members of the frequency converters 5 and 6.

We provide means for controlling the speed at which the rotor member of the frequency converter 6 is driven, thereby controlling the frequency of the current supplied to the alternating current load circuit 1. This speed control means may comprise means to control the excitation of generator 20, thereby controlling the voltage applied to the armature 16 of motor 14.

As a means for controlling the current supplied to the field winding 24 of generator 20, we provide suitable means, such as electric valve means, for transmitting different amounts of current to the field winding. This apparatus may comprise a transformer 25 which is energized from the supply circuit 2 and which includes a primary winding 26 and a secondary winding 27. Electric valve means 28 is provided to transmit unidirectional current to the field winding 24 and is energized from secondary winding 27. In order that the current transmitted to field winding 24 remain at a substantially constant preset value or at a value determined by the control system explained hereinafter, we provide an electric valve 29 which is poled in opposition to electric valve 28. That is, the electric valve 29 provides a path to permit the flow of current through the winding 24 in the desired direction during those half cycles in which the voltage applied to the anode-cathode circuit of electric valve 28 is negative. The electric valve 28 is preferably of the type employing an ionizable medium, such as a gas or a vapor, and includes control means such as a grid 30 the potential of which controls the amount of current transmitted to field winding 24.

We provide means for controlling the amount of current transmitted to field winding 24 of generator 20 in response to a predetermined condition of the system which is indicative of the speed of the motor 3. If the load imposed on the fan 4 remains substantially constant, the armature output voltage of generator 20 or the applied armature voltage of motor 14 may be employed as this criterion. If the motor 3 is subjected to varying loads, it will be appreciated that we may employ other means, such as tachometer generator driven by the motor 3, to provide a voltage which is indicative of speed.

Circuit 31 is connected to the Ward Leonard set 12 and the voltage thereof represents the speed of the motor 3 for the particular load imposed thereon. The voltage of circuit 31 is employed to control the conductivity of electric valve means 28 through apparatus described immediately hereinafter. If desired, the voltage of circuit 31 may be compared with a standard or reference voltage which may be produced by a constant voltage device, such as a glow discharge valve 32, which is of the type which maintains across its terminals a substantially constant voltage when in a conducting condition. The glow discharge valve 32 may be energized from transformer 25 through a rectifier 33, a capacitance 34 which is charged by rectifier 33 to the polarity indicated, and filtering means such as an inductance 35 and a resistance 36.

The difference between the voltage of circuit 31 and the standard voltage is employed to control the conductivity of the electric valve means 28. If desired, this voltage difference may be amplified by means of an electric discharge device 37 which is preferably of the high vacuum type comprising an anode 38, a cathode 39 and having control means such as a control grid 40, a screen grid 41 and a suppressor grid 42 which may be maintained at cathode potential. Control grid 40 is connected to the common juncture 43 of resistances 44 and 45 which are energized in response to the difference between the voltage of circuit 31 and the reference voltage produced by glow discharge valve 32. As the potential of the juncture 43 varies, the conductivity of the electric discharge device 37 varies, thereby controlling the potential impressed on grid 30. A current limiting resistance 46 may be connected in series relation with the control grid 40, and a filtering capacitance 47 may be connected between the cathode and juncture 43. I provide means for maintaining the potential of the screen grid 41 at a substantially constant value. This means may comprise a voltage divider including a rectifier 48 and resistances 49 and 50. In this manner, a high degree of sensitivity of electric discharge device 37 as an amplifier is obtained. A further filtering means, such as a capacitance 51, may be connected between the screen grid 41 and the cathode 39.

The potential of the control grid 30 of electric valve means 28 is varied in response to the conductivity of electric discharge device 37 through a circuit which may be considered a bridge circuit, one branch of which is a capacitance 52 and the other branch or arm thereof is the parallel circuit comprising resistance 53 and rectifier 54, and electric discharge device 37. A resistance 55 may be connected between the parallel branches and capacitance 52 if desired. A filtering capacitance 56 may be connected between the cathode and the control grid 30, and the current limiting resistance 57 is connected between the grid 30 and the common juncture of resistance 55 and capacitance 52.

We provide a plurality of control and starting stations 58 and 59 which may be remotely situated from the converting apparatus and the motor 3, and which may be displaced physically from each other. The control stations 58 and 59 include means for starting the system, and include means for presetting the speed of the motor 3 at a value which it is desired to be maintained. Control stations 58 and 59 are similar in construction and arrangement, and only one of the stations, such as station 58, will be considered in detail.

Control station 58 comprises a voltage divider including a resistance 60 having an adjustable contact 61 which controls or adjusts the component of the reference voltage which is effective and which operates in opposition to the voltage of circuit 31, thereby controlling the degree of conductivity of the electric discharge device 37 and the conductivity of the electric valve means 28. It will be noted that contact 61 may be connected in circuit with glow discharge valve 32 and resistances 44 and 45 through connections 62 and 63.

To assure that the system is initiated in its operation under predetermined conditions, such as minimum speed conditions, the movable contact 61 is provided with interlocking contacts 64. In this manner, the contacts 61 must, in order to initiate operation of the system, be moved to the minimum speed setting. Contacts 64 are connected in circuit with control apparatus described hereinafter.

We provide selector switches 65 and 66 at the remote control stations 58 and 59 to permit selection of that station from which the speed control of the motor 3 is to be directed. When a switch is closed, the control may be directed from the associated station.

We provide a protective means, such as a relay 67, having an actuating coil 68 and contacts 69, 70 and 71, which is designed to close with a predetermined time delay after the energization of the supply circuit 2, and only if the control station 58 or 59 is in the proper condition for starting. Actuating coil 68 is connected in circuit with contacts 64 of control stations 58 and 59 so that this coil cannot be energized unless contacts 64 are closed. Contacts 69 are connected to control the energization of electric valve means 28 and electric discharge device 37 and the associated equipment; contacts 70 are sealing-in contacts so that after closure of relay 67 contacts 61 may be moved to open contacts 64. Contacts 61 are interlocking contacts with the protective system for the control apparatus associated with the driving means 11.

We also provide somewhat similar control apparatus for variably energizing the field winding 23 of generator 19 which determines the torque applied to the rotating member of the frequency converter 5. This apparatus is essentially the same as that explained above in connection with the driving means 12 and will be presented rather briefly. An electric valve means 72 variably energizes field winding 23 from the alternating current supply circuit 2 through a transformer 73. An oppositely poled rectifier 74 serves to maintain a substantially constant current flow by providing a circuit for the flow of current incident to the electromagnetic energy stored in the field winding 23. The potential of control grid 75 of electric valve means 72 is determined by a bridge circuit comprising a capacitance 76 as one branch, a resistance 77 and a rectifier 78 as another branch, and an electric discharge device 79 as the third branch. These branches may be interconnected through a resistance 80. Electric discharge device 79 is of the high vacuum type including a control grid 81 and a screen grid 82, the potential of the latter being maintained at a substantially constant value by means of a voltage divider comprising a rectifier 83 and resistances 84 and 85. A suitable circuit for producing a standard or reference voltage is employed, and may comprise a glow discharge valve 86, capacitance 87 which is charged through a rectifier 88, and may include filtering means such as an inductance 89 and resistance 90.

A protective means, such as a relay 91, may also be employed and the actuating coil 92 may be energized in response to the operation of relay 67. More particularly, the actuating coil 92 may be connected in series relation with contacts 71 of relay 67 so that the control system associated with the driving means 11 is not energized until relay 67 is closed. It will be noted that contacts 93 of relay 91 are connected in circuit with the control apparatus including electric valve means 72 and electric discharge device 79.

We provide means for maintaining a predetermined division of load, such as an equal division of load, between the frequency converters 5 and 6. This means may comprise a plurality of independent circuits responsive to predetermined electrical conditions such as the currents supplied by the respective frequency changing means. For example, we provide current responsive circuits 94 and 95 which are energized from current transformers 96 and 97 through transformers 98 and 99, respectively. Circuits 94 and 95 produce across resistances 100 and 101, respectively, unidirectional voltages which represent the load currents transmitted by the associated frequency converters 5 and 6. These unidirectional voltages may be provided by employing rectifiers 102 and 103 which are energized from transformers 98 and 99. Filtering circuits including inductances 104 and 105 and capacitances 106 and 107 may also be employed to stabilize the voltage appearing across resistances 100 and 101. In order to control or adjust the magnitude of the unidirectional voltages for different values of current transmitted by the frequency converters 5 and 6, we employ suitable means such as adjustable resistances 108 and 109 which are connected across the secondary windings respectively of transformers 98 and 99. Voltage protective means, such as resistances 110 and 111, may also be connected across the secondary windings. These resistances may be of the type having negative resistance-current characteristics such as that disclosed and claimed in U. S. Letters Patent No. 1,822,742 of Karl B. McEachron, granted September 8, 1931, and which is assigned to the assignee of this application.

If desired, suitable voltage protective means may also be connected across the field winding 24 of generator 20. This voltage protective means may comprise a resistance 112 also having a negative resistance-current characteristic for preventing the voltage impressed across winding 24 from assuming dangerously high values.

In the event it is desired to use the generator output voltage, or the applied motor armature voltage, as the controlling influence indicative of the frequency supplied to load circuit 1 or the speed of the motor 3, we may employ other means, such as a tachometer generator 113, which is mechanically coupled to the motor 14 to produce a unidirectional voltage which varies directly as the speed of the motor 14, or in accordance with the speed of the rotor of the frequency converter 6. When a tachometer generator is employed, circuit 31 may be connected to the armature of the tachometer generator through switch 114.

We provide means for limiting the current during the starting operation. More particularly, we provide means for controlling the rate at which the potentials of the control grids 40 and 30 of electric discharge device 37 and electric valve means 28, respectively, vary, thereby controlling the rate of the increase of energization of the generator field winding 24. One way in which this control of the rate of increase of current during the starting operation may be effected is by the use of a capacitance 115 connected across resistance 44 to control the rate at which the potential of control grid 40 becomes negative during the starting operation. In this manner, the rate at which the potential of control grid 30 of electric valve means 28 becomes positive is also controlled and consequently controls the rate of increase of the current transmitted to the field winding 24 of generator 20.

In accordance with the teachings of our invention, the load balance between the frequency converters 5 and 6 may be obtained by utilizing the load currents transmitted by the driving units for generators 19 and 20 of the Ward Leonard sets. For example, induction motors 115 and 116 which drive generators 19 and 20 may be employed to produce the controlling influences which effect the balance in the load delivered by frequency converters 5 and 6. Induction motors 115 and 116 may be energized from alternating current supply circuits 117 and 118, or may be connected directly to the alternating current supply circuit 2. Current transformers 119 and 120 may be employed to produce voltages which indicate the loads on the induction motors 115 and 116 and may be connected to circuits 94 and 95 through switches 121 and 122. These switches make it possible to energize circuits 94 and 95 selectively from transformers 96, 97 or 119, 120.

We also provide means for preventing hunting of the control systems associated with the frequency changers or converters 5 and 6. This means may be associated with the driving means or Ward Leonard sets 11 and 12. For example, it has been found that hunting of the driving units may be completely prevented or substantially reduced by controlling the rate of change of energization of field windings 23 and 24 of generators 19 and 20, respectively. One way in which this damping may be effected is to control the rate at which the potentials of grids 40 and 81 of the electric discharge devices 37 and 79, respectively, are varied. Predetermined electrical conditions of the generators 19 and 20 may be employed to control the rate of change of the voltages of grids 40 and 81. For example, the voltage produced by the rate of change of current through the commutating or interrupting devices of generators 19 and 20 may be employed to control the rate of change of the potentials impressed on grids 40 and 81. Commutating windings 123 and 124 of generators 19 and 20, respectively, are connected to resistances 46 and 125, respectively, through circuits 126 and 127 including transformers 126' and 127'.

The voltage supplied to the frequency converters 5 and 6 and the circulating current therebetween may be controlled or adjusted by suitable voltage controlling means such as induction regulators 128 and 129. These voltage regulating means may be manually adjustable or may be controlled automatically in accordance with the control system shown in Fig. 2. The induction regulators 128 and 129 are illustrated diagrammatically and each regulator may comprise three single-phase induction regulators of the type which includes a single phase stator winding which produces a pulsating field, and a movable secondary member which is rotatably positionable relative to the stationary member. The magnitude of the voltage induced in the winding of the rotatable member is determined by the angular relationship between the axes of the windings on the stationary and the rotatable members.

The operation of the embodiment of our invention shown in Fig. 1 of the drawings will now be explained. We have found that the rotor members of the frequency converters 5 and 6 may be rotated in either direction relative to the magnetic field produced by the stator windings 7 and 8. The direction of rotation of the rotor members is, of course, controlled by controlling the direction of rotation of the motors 13 and 14. In the description of the operation immediately following, it will be assumed that the rotor members of the frequency converters 5 and 6 are rotated in a direction opposite to the direction of rotation of the stator magnetic fields produced by windings 7 and 8. Consequently, at standstill the frequency of the voltage induced in the secondary windings 9 and 10 will be the frequency of the alternating current supply circuit 2. We have found that with a particular type of load, such as a fan load, there will not be imposed on the system an excessive load due to the fact that at standstill and at relatively low speeds of the fan 4 the torque imposed on the motor 3 and the frequency converters 5 and 6 is not of such a magnitude as to overload the apparatus. Furthermore, as the rotor members of the frequency converters 5 and 6 are rotated in opposition to the magnetic field produced by the stator windings 7 and 8, the output frequency of the converters 5 and 6 increases, the magnitude of the output frequency of the frequency converters, or the magnitude of the frequency supplied to the motor 3, being a function of the frequency of the supply circuit 2 and the speed of the rotor members of the frequency converters.

If it be assumed that it is desired to use the output voltage of generator 20, or the armature voltage applied to motor 14, as the controlling influence which maintains the speed of the system, switch 114 is moved to the left-hand position connecting circuit 31 to the armature connections of motor 14 and generator 20. Furthermore, let it be assumed that it is desired to control the system from station 58. Under these conditions, selector switch 65 will be closed and selector switch 66 will be opened. Immediately following energization of supply circuit 2, relay 67 will not be operated until the lapse of a predetermined interval of time, thereby affording a sufficient interval for the cathodes of the various associated electric valves to assume a safe operating temperature. Operation of the system will then not be initiated unless the contact 61 is moved to engage contacts 64, thereby assuring a predetermined minimum initial energization of the generator field winding 24. After the lapse of the predetermined interval of time, actuating coil 68 of relay 67 will be energized effecting closure of its contacts 69–71, inclusive. Contacts 70 are sealing-in contacts which maintain the coil 68 energized even though the contact 61 is subsequently moved to disengage contacts 64. Upon closure of contacts 71, relay 91 is energized thereby effecting energization of the control apparatus for the driving means 11. As the contact 61 is moved to the left along resistance 60, the current supplied to generator field winding 24 is increased and consequently the voltage applied to armature circuit of motor 14 is also increased, thereby increasing the speed of the motor and effecting an increase in the output frequency of the converter 6. The position to which the contact 61 is finally moved is determined by the desired speed of motor 3.

During this starting operation, the driving means 11 is also automatically controlled to increase the speed of rotation of the rotor member of the frequency converter 5 at the same rate as the frequency converter 6. This result is obtained by virtue of the current responsive circuits 94 and 95 which conjointly control the energization of field winding 23 of generator 19. The current balancing circuits 94 and 95 together operate to cause the converters 5 and 6 to assume equal amounts of load, thereby maintaining the rotor members thereof in substantial synchronism.

After the contact 61 is established at the desired point to preset a given value of speed for the motor 3 and the fan 4, the system automatically responds to maintain the speed of the motor 3 at this constant value. Of course, it is to be appreciated that under these conditions it is assumed that the load imposed on the fan 4 remains substantially constant. If it be assumed that the voltage applied to the armature of motor 14 tends to decrease, indicating a decrease in the speed of the motor 14 and the speed of the converter 6, the resultant unidirectional voltage impressed on control grid 40 of electric discharge device 37 becomes less positive or more negative, thereby increasing the voltage impressed on grid 30 of electric valve means 28 and causing this electric valve means to conduct a greater amount of current to the generator field winding 24. In this manner, the voltage applied to the armature of motor 14 and the speed thereof are raised to the desired values. Conversely, if the voltage applied to the armature of motor 14 tends to increase to a value above the desired value, indicating an increase of speed or the frequency converter 6, the reverse operation takes place wherein the potential of grid 40 becomes more positive, thereby lowering the potential applied to grid 30 of electric valve 28, causing this electric valve to conduct a smaller amount of current thereby reducing the excitation of the generator 20.

We have found that the load is equally divided between the frequency converters 5 and 6 by virtue of the speed control associated with one of the units and the current balancing function of circuits 94 and 95. Furthermore, we have found that the frequency converters 5 and 6 are maintained in substantial synchronism under these conditions. If it be assumed that the frequency converter 6 temporarily tends to assume a greater portion of the load, the voltage appearing across resistance 101 will increase, thereby lowering the potential of grid 81 of discharge device 79 and effecting an increase in the potential of grid 75 of electric valve 72. As a result thereof, the current transmitted to the field winding 23 of generator 19 is increased, thereby increasing the speed of the motor 13 to cause the frequency converter 5 to assume a greater load which re-establishes the desired equal distribution of load between the two converters. The system also operates in a similar manner to decrease the energization of the field winding 23 of generator 19 in the event the frequency converter 5 tends to assume a load greater than that delivered by the frequency converter 6.

The operation of the control circuits of electric valve 28 and the electric discharge device 37 will now be considered. When the electric valve means 28 is of the gaseous type, it will be appreciated that the amount of current conducted thereby is determined by the time during its positive half-cycle of applied anode-cathode voltage at which current conduction is initiated. The average value of the current conducted thereby is increased as the times of initiation are advanced toward the beginning of the positive half cycles of applied anode-cathode voltage, and, conversely, the current is decreased as those times are retarded. The electric valve means 29 is poled in opposition to electric valve means 28 and provides a path for the flow of current incident to the stored electromagnetic energy in the field winding 24. In this manner, the current transmitted to field winding 24 for a particular value thereof established by the conductivity of the electric valve means 28 is maintained at a substantially constant value.

The potential of the grid 30 of electric valve means 28 is determined by the relative amounts of current conducted by electric discharge device 37 and the electric valve or rectifier 54. The current conducted by electric valve 54 tends to charge the left-hand plate of capacitance 52 positively, thereby raising the potential of control grid 30 of electric valve means 28. The current conducted by electric discharge device 37 tends to charge the left-hand plate of capacitance 52 negatively, thereby lowering the potential of grid 30. For these reasons, the electric valve 54 may be termed the turn-on electric valve and the discharge device 37 may be termed the turn-off electric valve. When the electric discharge device 37 is completely non-conducting, it will be appreciated that the potential of grid 30 becomes highly positive, thereby rendering the electric valve 28 fully conducting. Furthermore, as the electric discharge device 37 is rendered fully conducting, the conductivity of the electric valve 28 is decreased to zero or to a negligible value.

The conductivity of the electric discharge device 37 is controlled by the difference or resultant of the fixed component of standard or reference voltage produced by glow discharge valve 32 and the voltage of circuit 31. Resistance 60 and contact 61 of the remote control stations determine the speed of the motor 3 by controlling the component of the reference voltage against which the voltage of circuit 31 operates.

During the starting operation, the capacitance 115 controls the rate at which the potential of grid 40 of discharge device 37 becomes negative, thereby controlling the rate at which the system assumes load by controlling the rate at which the potential of control grid 30 becomes positive. This action is obtained by virtue of the fact that the capacitance 115 is connected to circuit 31 and since it requires an appreciable time for its condition, to change from a discharged condition to a state of charge.

If it is desired to use the actual speed of the motor 14 as the controlling influence, switch 114 may be moved to the right-hand position wherein the tachometer generator 113 is connected to circuit 31. For this arrangement, the output voltage of the tachometer generator 113 is used as the controlling influence and the system operates in substantially the same manner as that explained above to maintain the speed of the system at a fixed preset value.

Where the fan 4 is subjected to a varying load so that accuracy of control is not obtainable by using a controlling influence derived from the driving means 12, the tachometer generator 113 may be connected directly to the motor 3 and the controlling influence derived directly from that motor.

The system also operates to maintain a predetermined or equal division of load between the frequency changers 5 and 6 when switches 121 and 122 are moved to positions to connect transformers 119 and 120 to circuits 94 and 95. When connected in this manner, the currents supplied to induction motors 115 and 116 produce the control voltages which maintain the desired equal division of load by frequency changers 5 and 6.

Fig. 2 diagrammatically illustrates another embodiment of our invention which is similar in many respects to the arrangement shown in Fig. 1, and corresponding elements have been assigned like reference numerals. In the arrangement of Fig. 2, the rotor windings 9 and 10 of frequency converters 5 and 6 are energized from the alternating current supply circuit 2 and the stator members 7 and 8 are connected in parallel and connected to the alternating current load circuit 1 or the induction motor 3. In this embodiment of our invention, the tachometer generator 113 is connected to the rotor member of one of the frequency converters 5 and 6, such as the rotor member of frequency converter 6. The output or armature generator of the tachometer generator 113 is connected to circuit 31 shown in Fig. 1 and serves to establish the controlling influence which maintains constant the frequency of the current transmitted to the load circuit 1.

As a means for adjusting the voltages which are supplied to the rotor members 9 and 10 of the frequency converters 5 and 6 and as a means for controlling the circulating current therebetween, we may employ auto-transformers 130 and 131 which may be manually adjustable.

We also provide means for maintaining a predetermined distribution of load, such as an equal distribution of current, between the frequency converters 5 and 6 during starting and running operations. This load balancing means may comprise voltage controlling apparatus for automatically controlling the voltages supplied to the rotor windings 9 and 10. For example, we may employ a plurality of single phase induction regulators 132 and 133 to control the magnitude of the voltage impressed on windings 9 and 10. The desired load balance may be obtained by operating conjointly on the induction regulators 132 and 133, or by operating only on one set of the induction regulators. The induction regulators 132 and 133 may each be of the single-phase type comprising relatively movable members, the magnitude of the output voltage being determined by the relative positions of the stationary and rotatable members. In the embodiment of our invention illustrated in Fig. 2, the load balancing operation is obtained by controlling only the induction regulators 132 associated with frequency converter 5. The angular position of the rotor members of the induction regulators 132 may be controlled by means of a motor 134 having an armature 135 and a pair of opposing field windings 136 and 137 which are selectively energized from a source of current, such as a battery 138, through a controlling means or regulator 139.

The regulator 139 may comprise a lever 140 the position of which is determined by the energization of windings 141 and 142 which are energized from means responsive to the currents of the frequency converters 5 and 6. For example, we may employ current transformers 143 and 144 which are connected to actuating coils 141 and 142, respectively. Regulator 139 is also provided with contacts 145 and 146 which selectively connect winding 136 or 137 to battery 138. The energization of coil 142 is initially adjusted from suitable means such as a rheostat 147 to establish the desired distribution of current between frequency converters 5 and 6. If the load division tends to deviate from the desired value, the difference in energization of coils 141 and 142 moves lever 145 to the position which effects energization of winding 136 or 137 to restore the desired current balance.

We also provide means for adjusting the magnitudes of the output voltages of the frequency converters 5 and 6. This means may comprise manually adjustable means such as reactors 147 and 148 which are connected across windings 7 and 8.

The embodiment of our invention illustrated in Fig. 2 operates in substantially the same way as the arrangement of Fig. 1 to maintain an equal distribution of load delivered by the frequency converters 5 and 6. The tachometer generator 113 produces a unidirectional voltage the magnitude of which indicates the speed and the frequency of frequency converter 6 and, through circuit 31, controls the energization of field winding 24 of generator 20. In this manner, the speed of frequency converter 6 is maintained constant and the frequency of the current supplied to the load circuit 1 is also maintained constant.

The regulating or control systems connected to field windings 23 and 24 tend to maintain the speeds of the motors 13 and 14 at the same constant predetermined value and serves to maintain the load division between frequency converters 5 and 6 equal. The additional means which control the voltages supplied to rotor windings 9 and 10 of the frequency converters 5 and 6 supplements the last described means for maintaining the desired equal consumption of current from the supply circuit 2 by frequency converters 5 and 6. If the current transmitted to winding 9 of frequency converter 5 tends to deviate from the desired balance, regulator 139 operates to energize either winding 136 or 137 of motor 134, thereby operating the single phase regulators 132 to control the voltage impressed on windings 9 to restore the desired load balance.

Reactors 147 and 148 may be moved manually to balance the output voltages of the frequency converters 5 and 6. In this manner circulating currents between the frequency converters 5 and 6, particularly the stator windings 7 and 8, may be reduced or substantially eliminated.

While we have shown and described our invention as applied to particular systems of connections and as embodying various devices diagrammatically shown, it will be obvious to those skilled in the art that changes and modifications may be made without departing from our invention and we, therefore, aim in the appended claims to cover all such changes and modifications as fall within the true spirit and scope of our invention.

What we claim as new and desire to secure by Letters Patent of the United States is:

1. In combination, an alternating current supply circuit, an alternating current load circuit, frequency changing means connected between said supply circuit and said load circuit and comprising a rotor member and a stator member, driving means for said rotor member, and means responsive to a predetermined condition of the driving means for controlling the frequency of the current supplied to said load circuit.

2. In combination, an alternating current supply circuit, an alternating current load circuit, frequency changing means connected between said supply circuit and said load circuit and comprising a rotor member and a stator member, driving means for said rotor member, means for controlling the frequency of the current supplied to said load circuit, and means for controlling said last mentioned means to preset the frequency of the load current.

3. In combination, an alternating current supply circuit, an alternating current load circuit, frequency changing means connected between said supply circuit and said load circuit and comprising a rotor member and a stator member, a Ward Leonard set for driving said rotor member and comprising a motor and a generator having a field winding, and means responsive to the armature voltage of said motor for variably energizing the generator field winding and for maintaining the frequency of the current supplied to said load circuit at a substantially constant value.

4. In combination, an alternating current supply circuit, an alternating current induction motor, frequency changing means connected between said supply circuit and said induction motor and comprising a dynamo-electric machine frequency converter of the induction type including stator and rotor members, means for driving said rotor member comprising a Ward Leonard set including a motor mechanically coupled to said rotor and including a generator having a field winding, and means responsive to a predetermined condition of said motor for variably energizing the generator field winding and for controlling the speed of said induction motor.

5. In combination, an alternating current supply circuit, an alternating current induction motor, frequency changing means connected between said supply circuit and said induction motor and comprising a dynamo-electric machine frequency converter of the induction type including stator and rotor members, means for driving said rotor member comprising a Ward Leonard set including a motor mechanically coupled to said rotor and including a generator having a field winding, and means responsive to a predetermined condition of said motor for variably energizing the generator field winding and for maintaining the speed of said induction motor at a substantially constant value for substantially constant load conditions imposed on said motor.

6. In combination, an alternating current supply circuit, an alternating current load circuit, frequency changing means connected between said supply circuit and said load circuit and comprising a rotor member and a stator member, driving means mechanically coupled to said rotor member, control means for said driving means for controlling the frequency of the current supplied to said load circuit, and means connected to said control means comprising means to assure a predetermined initial energization of said driving means during the starting operation.

7. In combination, an alternating current supply circuit, an alternating current load circuit, frequency changing means connected between said supply circuit and said load circuit and comprising a rotor member and a stator member, driving means for said rotor member comprising a Ward Leonard set including a motor mechanically coupled to said rotor member and a generator having a field winding for energizing said motor, control means for energizing the generator field winding, and a control and starting station comprising means for assuring a predetermined minimum energization of said generator field winding during the starting operation.

8. In combination, an alternating current supply circuit, an alternating current load circuit, frequency changing means connected between said supply circuit and said load circuit and comprising a rotor member and a stator member, driving means for said rotor member comprising a Ward Leonard set including a motor mechanically coupled to said rotor member and a generator having a field winding for energizing said motor, electric valve means for controlling the energization of the generator field winding, and a control and starting station connected to said electric valve means comprising means to assure a predetermined initial energization of said generator field winding.

9. In combination, an alternating current supply circuit, an alternating current load circuit, frequency changing means connected between said supply circuit and said load circuit and comprising a rotor member and a stator member, driving means for said rotor member, electric valve means energized from said supply circuit for controlling the energization of said driving means, protective means having normally open contacts connected between said supply circuit and said electric valve means, control and starting means connected to said electric valve means, and interlocking means connected between said protective means and said control means for preventing closure of said protective means unless said control means is in a predetermined initiating starting position.

10. In combination, an alternating current supply circuit, an alternating current load circuit, a plurality of frequency changing means connected between said supply circuit and said load circuit and connected to supply power in parallel to said load circuit and each comprising a rotor member and a stator member, a plurality of individual means for mechanically driving the rotor members, and means for controlling the frequency of the current supplied to said load circuit comprising means responsive to a predetermined condition of the driving means for one of said frequency changing means and means responsive to a resultant of the loads delivered by said plurality of frequency changing means.

11. In combination, an alternating current supply circuit, an alternating current load circuit, a plurality of frequency changing means connected between said supply circuit and said load circuit and connected to supply power in parallel to said load circuit and each comprising a rotor member and a stator member, a plurality of individual means for mechanically driving the rotor members, and means responsive to a predetermined condition of the driving means for one of said frequency changing means for controlling the frequency of the current supplied to said load circuit.

12. In combination, an alternating current supply circuit, an alternating current load circuit, a plurality of frequency changing means connected between said supply circuit and said load circuit and connected to supply power in parallel to said load circuit, each of said frequency changing means being of the induction type including a stator member and a rotor member, a plurality of individual means each associated with a different one of the frequency changing means for mechanically driving the rotor members, means for controlling the speed at which the rotor member of one of the frequency changing means is driven, and means responsive to a resultant of the loads of the frequency changing means for maintaining a predetermined division of load thereamong.

13. In combination, an alternating current supply circuit, an induction motor, a plurality of frequency changing means connected between said supply circuit and said induction motor for controlling the speed thereof and each including a dynamo-electric machine of the induction type having a rotor member and a stator member, a plurality of individual means each associated with a different one of the frequency changing means for mechanically driving the rotor member thereof, means for maintaining the speed at which one of said rotor members is driven at a substantially constant value, and means responsive to predetermined electrical conditions of said frequency changing means for maintaining a predetermined division of load thereamong.

14. In combination, an alternating current supply circuit, an alternating current load circuit, a plurality of frequency changing means connected between said supply circuit and said load circuit and each comprising a dynamo-electric machine of the induction type having a rotor member and a stator member, a plurality of individual Ward Leonard sets each connected to a different one of the rotor members and each including a generator and a motor having an armature winding, means responsive to the voltage applied to the motor armature of one of said sets for maintaining the speed of said motor at a substantially constant value, and means responsive to a resultant of the loads supplied by said frequency changing means for maintaining an equal division of load thereamong.

15. In combination, an alternating current supply circuit, an alternating current load circuit, a dynamo-electric machine frequency changer of the induction type having a rotor member and a stator member, a Ward Leonard set for driving said rotor member and comprising a motor and a generator having a field winding, and means for controlling the frequency of the current transmitted to said load circuit and comprising means energized from said supply circuit including an electric valve means including a control member, means for producing a reference voltage and means responsive to the voltage applied to said motor and said reference voltage for controlling the potential of said control member.

16. In combination, an alternating current supply circuit, an alternating current load circuit, a plurality of dynamo-electric machine frequency changers connected between said supply circuit and said load circuit and connected to operate in parallel, a plurality of Ward Leonard sets each associated with a different one of said frequency changers for supplying power thereto, means connected to one of said Ward Leonard sets for determining the frequency of the current supplied to said load, and means responsive to the load delivered by one of said frequency changers for controlling the load transmitted by another frequency changer.

17. In combination, an alternating current supply circuit, an alternating current load circuit, a plurality of dynamo-electric machine frequency changers for supplying power to said load circuit, a plurality of Ward Leonard sets each connected to drive a different one of said frequency changers and each comprising a generator having a field winding and a motor, means for variably energizing the field winding of one of said generators to control the frequency of said load circuit, and means responsive to a resultant of the currents transmitted by the frequency changers to said load circuit for controlling the load division among said frequency changers.

18. In combination, an alternating current supply circuit, an alternating current load circuit, a plurality of dynamo-electric machine frequency changers connected between said supply circuit and said load circuit for supplying power in parallel thereto, a plurality of Ward Leonard sets each comprising a generator having a field winding and a motor which is mechanically coupled to an associated frequency changer, electric valve means for variably energizing the field winding of one of said generators, means responsive to the electrical condition of one of said Ward Leonard sets for maintaining the frequency of the current supplied to said load circuit at a substantially constant value, and means responsive to the resultant of the individual loads transmitted by said frequency changers for maintaining a predetermined division of load among said frequency changers.

19. In combination, an alternating current supply circuit, an alternating current load circuit, a pair of dynamo-electric machine frequency changing means of the induction type each including a stator member and a rotor member, a pair of Ward Leonard sets for driving independently the rotor members, each of the Ward Leonard sets including a motor mechanically coupled to the rotor member of the associated frequency changing means and a generator having a field winding, electric valve means responsive to the armature voltage of the motor of one of said sets for maintaining the speed thereof substantially constant, a pair of current responsive means each associated with a different one of said frequency changing means, and electric valve means responsive to said current responsive means for variably energizing the field winding of the generator associated with the other frequency changing means to maintain an equal distribution of load between said frequency changing means.

20. In combination, an alternating current supply circuit, an alternating current load circuit, a plurality of frequency changing means connected between said supply circuit and said load circuit and connected to supply power in parallel to said load circuit and each comprising a rotor member and a stator member, a plurality of individual means for mechanically driving the rotor members, and means for controlling the frequency of the current supplied to said load circuit comprising means responsive to a predetermined condition of the driving means and means responsive to the resultant of predetermined conditions derived from said frequency changing means.

21. In combination, an alternating current supply circuit, an alternating current load circuit, a plurality of frequency changing means connected between said supply circuit and said load circuit and connected to supply power in parallel to said load circuit and each comprising a rotor member and a stator member, a plurality of individual means for mechanically driving the rotor members, and means for controlling the frequency of the current supplied to said load circuit comprising means responsive to a predetermined condition of the driving means comprising means responsive to the speed at which the rotor members are driven and means responsive to a resultant of predetermined electrical conditions derived from the rotor members.

22. In combination, an alternating current supply circuit, an alternating current load circuit, a plurality of frequency changing means connected between said supply circuit and said load circuit and connected to supply power in parallel to said load circuit and each comprising a rotor member and a stator member, a plurality of individual means for mechanically driving the rotor members and each including an induction motor, and means for maintaining a predetermined division of load among said frequency changing means comprising means responsive to predetermined electrical conditions of the induction motors for controlling the power transmitted to the rotor members.

23. In combination, an alternating current supply circuit, an alternating current load circuit, a plurality of frequency changing means connected between said supply circuit and said load circuit and connected to supply power in parallel to said load circuit and each comprising a rotor and a stator member, the stator members being connected in parallel and connected to said load circuit, a plurality of individual means for mechancially driving the rotor members and each comprising an induction motor, control means for the individual driving means, and means responsive to the currents of the induction motors for controlling said control means and for maintaining a predetermined division of load among said frequency changers.

24. In combination, an alternating current supply circuit, an alternating current load circuit, a plurality of frequency changing means connected between said supply circuit and said load circuit and each comprising a rotor member and a stator member, the stator members being connected in parallel and connected to said load circuit and the rotor members being electrically connected to said supply circuit, a plurality of individual driving means mechanically coupled to the rotor members and each including a Ward Leonard set comprising a motor and a generator, a plurality of individual induction motors for driving the generators of the Ward Leonard sets, and means responsive to the loads of the induction motors for controlling the excitation of the generators to maintain a predetermined distribution of the load among said frequency changing means.

25. In combination, an alternating current supply circuit, an alternating current load circuit, a plurality of frequency changing means connected between said supply circuit and said load circuit and connected to supply power in parallel to said load circuit and each comprising a rotor member and a stator member, a plurality of means for mechanically driving the rotor members to determine the frequency of the current delivered to said load circuit, a plurality of individual voltage controlling means connected between said supply circuit and said frequency changing means, and means responsive to predetermined electrical conditions of said frequency changing means for controlling at least one of the voltage controlling means to maintain a predetermined distribution of load among said frequency changing means.

26. In combination, an alternating current supply circuit, an alternating current load circuit, a plurality of frequency changing means connected between said supply circuit and said load circuit and connected to supply power in parallel to said load circuit and each comprising a rotor member and a stator member, a plurality of individual means for mechanically driving the rotor members and for controlling the frequency of the current supplied to said load circuit, a plurality of individual voltage controlling means connected between said supply circuit and said frequency changing means, and means responsive to the currents transmitted between said supply circuit and said frequency changing means for controlling the voltagee controlling means.

27. In combination, an alternating current supply circuit, an alternating current load circuit, a plurality of frequency changing means connected between said supply circuit and said load circuit and connected to supply power in parallel to said load circuit and each comprising a rotor member and a stator member, a plurality of individual means for mechanically driving the rotor members and for determining the frequency of the current supplied to said load circuit, voltage controlling means connected between said supply circuit and said frequency changing means, and means responsive to the load of said frequency changing means for controlling said voltage controlling means and for maintaining a predetermined division of load thereamong during the starting operation of said frequency changing means.

28. In combination, an alternating current supply circuit, an alternating current load circuit, frequency changing means connected between said supply circuit and said load circuit and comprising a rotor member and a stator member, driving means for said rotor member comprising a Ward Leonard set including a motor and a generator, said generator including a field winding and a commutating winding, means for variably energizing said field winding and for controlling the speed at which said rotor member is driven, and anti-hunting means connected between said commutating winding and the last mentioned means for controlling the rate at which the excitation of said field winding is varied.

29. In combination, an alternating current supply circuit, an alternating current load circuit, frequency changing means connected between said supply circuit and said load circuit and comprising a rotor member and a stator member, driving means for said rotor member comprising a Ward Leonard set including a motor and a generator, said generator including a field winding, control means for variably energizing said field winding and for maintaining the speed constant at which said rotor is driven, and anti-hunting means connected between said generator and said control means for controlling the rate at which the energization of said field winding is varied.

30. In combination, a polyphase alternating current supply circuit, an alternating current load circuit, translating apparatus connected between said circuits and comprising frequency changing means including a rotor member and a stator member, driving means for said rotor member, a plurality of single phase induction regulators connected between said supply circuit and said frequency changing means for controlling the magnitude of the voltage supplied thereto, means operating in parallel with said frequency changing means and connected between said supply circuit and said load circuit, and means responsive to the loads transmitted by said frequency changing means and the last mentioned means for controlling said induction regulators.

31. In combination, an alternating current supply circuit, an alternating current induction motor, frequency changing means connected between said supply circuit and said induction motor and comprising a dynamo-electric machine frequency converter of the induction type including stator and rotor members, means for driving said rotor member, and means responsive to the current transmitted by said converter and connected between said supply circuit and said converter for controlling the voltage supplied thereto.

32. In combination, an alternating current supply circuit, an alternating current load circuit, frequency changing means connected between said supply circuit and said load circuit and comprising a pair of dynamo-electric machine frequency converters of the induction type each including stator and rotor members, means for driving the rotor members, and means for controlling the circulating current between said frequency converters comprising a pair of autotransformers each connected between said supply circuit and a different one of said converters and each including means for adjusting the voltage supplied to the associated converter.

33. In combination, an alternating current supply circuit, an alternating current load circuit, frequency changing means connected between said supply circuit and said load circuit and comprising a pair of dynamo-electric machine frequency converters of the induction type each including stator and rotor members, a plurality of individual means for driving the rotor members, speed controlling means for the last mentioned means, starting means for the driving means, and means for controlling the circulating current between said frequency converters comprising a pair of auto-transformers each connected between said supply circuit and a different one of said frequency converters and including means for adjusting the voltage supplied thereto.

34. In combination, an alternating current supply circuit, an alternating current load circuit, frequency changing means connected between said supply circuit and said load circuit and comprising a pair of dynamo-electric machine frequency converters of the induction type each including stator and rotor members, a plurality of individual means for driving the rotor members, speed controlling means for the last mentioned means, starting means for the driving means, means for controlling the circulating current between said frequency converters comprising a pair of auto-transformers each connected between said supply circuit and a different one of said frequency converters and each including means for adjusting the voltage supplied thereto, and means connected to the driving means for balancing the load supplied by said frequency converters.

35. In combination, an alternating current supply circuit, an alternating current load circuit, frequency changing means connected between said circuits and comprising a dynamo-electric machine of the induction type including stator and rotor members, driving means for said rotor member comprising a Ward Leonard set including a motor and a generator, said generator including a field winding, control means for variably energizing said field winding to control the speed at which said rotor member is driven, and anti-hunting means connected between said control means and said driving means.

36. In combination, an alternating current supply circuit, an alternating current load circuit, frequency changing means connected between said circuits and comprising a dynamo-electric machine of the induction type including stator and rotor members, driving means for said rotor member comprising a Ward Leonard set including a motor and a generator, said generator including a field winding, control means for variably energizing said field winding to control the speed at which said rotor member is driven, and anti-hunting means for controlling said control means and comprising means responsive to the rate of change of current transmitted between said generator and said motor.

37. In combination, an alternating current supply circuit, an alternating current load circuit, frequency changing means connected between said circuits and comprising a dynamo-electric machine of the induction type including a rotor member and a stator member, driving means for said rotor member including a Ward Leonard set having a motor mechanically coupled to said rotor member and including a generator, said generator having a field winding, excitation means for said field winding, and means comprising a tachometer generator driven by said rotor member for controlling said excitation means.

38. In combination, an alternating current supply circuit, an alternating current load circuit, frequency changing means connected between said supply circuit and said load circuit and including a dynamo-electric machine of the induction type having a rotor member and a stator member, driving means for said rotor member comprising a Ward Leonard set having a motor mechanically coupled to said rotor member and having a generator provided with a field winding, excitation means for controlling the current transmitted to said field winding comprising an electric discharge device having a grid, means for controlling the potential of said grid in response to the speed at which said rotor member is driven, and anti-hunting means connected between said Ward Leonard set and said grid.

39. In combination, an alternating current supply circuit, an alternating current load circuit, frequency changing means connected between said supply circuit and said load circuit and including a dynamo-electric machine of the induction type having a rotor member and a stator member, driving means for said rotor member comprising a Ward Leonard set having a motor mechanically coupled to said rotor member and having a generator provided with a field winding, excitation means for controlling the current transmitted to said field winding comprising an electric discharge device having a grid, means for controlling the potential of said grid to control the speed at which said rotor member is driven, and anti-hunting means for controlling the potential of said grid in accordance with the rate of change of current transmitted between said generator and said motor.

ELMO E. MOYER.
CHARLES C. CLYMER.